March 13, 1934. J. H. HAMMOND, JR Re. 19,107

SYSTEM AND METHOD OF COMMUNICATION

Original Filed Sept. 2, 1926 8 Sheets-Sheet 1

INVENTOR
JOHN HAYS HAMMOND JR.
BY Ira J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 2

INVENTOR
JOHN HAYS HAMMOND JR.
BY Thos J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 3

INVENTOR
JOHN HAYS HAMMOND JR.
BY Fra J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 4

INVENTOR
JOHN HAYS HAMMOND JR.
BY Ira J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 5

INVENTOR
JOHN HAYS HAMMOND JR.
BY Ira J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 6

INVENTOR
JOHN HAYS HAMMOND JR.
BY Ira J. Adams
ATTORNEY

March 13, 1934. J. H. HAMMOND, JR Re. 19,107

SYSTEM AND METHOD OF COMMUNICATION

Original Filed Sept. 2, 1926 8 Sheets-Sheet 7

Inventor
JOHN HAYS HAMMOND JR.

By his Attorney Ira J. Adams

March 13, 1934. J. H. HAMMOND, JR Re. 19,107

SYSTEM AND METHOD OF COMMUNICATION

Original Filed Sept. 2, 1926 8 Sheets-Sheet 8

Inventor
JOHN HAYS HAMMOND JR.

By his Attorney Ira J. Adams

Reissued Mar. 13, 1934 Re. 19,107

UNITED STATES PATENT OFFICE 19,107

SYSTEM AND METHOD OF COMMUNICATION

John Hays Hammond, Jr., Gloucester, Mass.

Original No. 1,785,307, dated December 16, 1930, Serial No. 133,094, September 2, 1926. Application for reissue October 24, 1931, Serial No. 571,162

33 Claims. (Cl. 177—352)

Some of the objects of this invention are to provide an improved means and method for determining the bearings of a ship at sea, the location of a ship at sea with respect to known points on the shore, the relative velocity of a ship toward or from known points on the shore, and speed of a ship. Still other objects will hereafter appear as the description proceeds.

In the accompanying drawings, Fig. 1 shows a general lay-out of a system embodying the invention.

Heretofore the general method of indicating a ship's bearing has been by the use of loop and other directional aerials which have been rather erratic in operation and expensive to construct and operate, and the present invention aims to provide a radically different and more dependable system and method described below.

Purposes of this invention are to enable the navigator of a vessel approaching the shore to ascertain his location with reference to fixed points along the shore line and also his velocity in respect to one or all of these points. The system for obtaining such information comprises a source of sound, such as an under-water oscillator, aboard the vessel, microphones located at known points along the shore line connected by submarine cables to a central radio transmitting station, a radio receiver on board the vessel and preferably a graphic recorder attached to said receiver.

From the radio transmitting station, signals modulated by the sound waves picked up by the microphones are received on board the vessel and from these received waves the ship's position, velocity and other data relative to its movement may be ascertained and computed.

Figure 1:
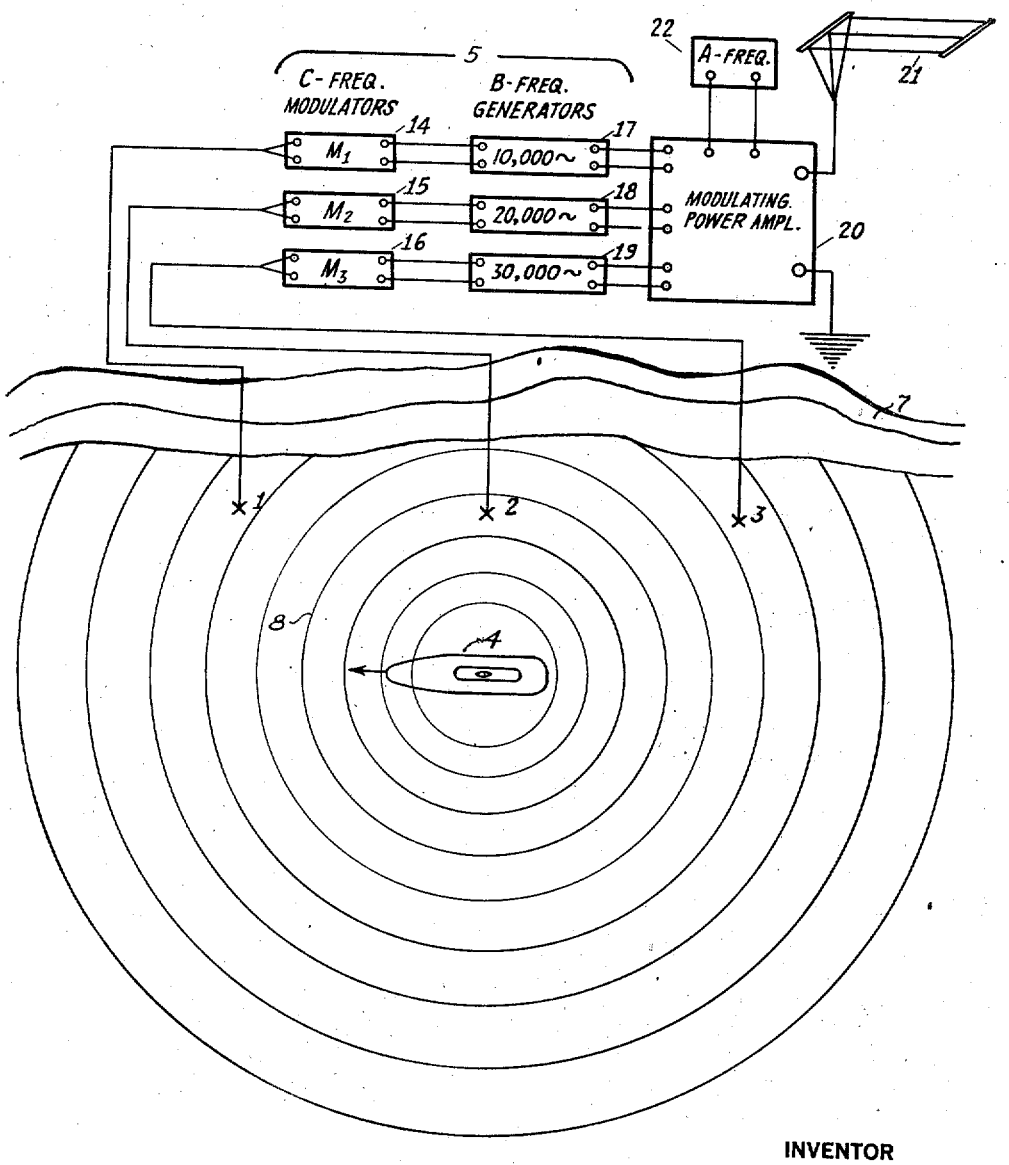

In Fig. 1 a typical installation is shown in which microphones numbered 1, 2 and 3 are attached by cables to radio station 5 located on the shore. The vessel 4 carries a source of sound to produce sound waves in the water as indicated by 8.

To get an indication of the speed at which the ship approaches a fixed point, such as station 1, the ship's sound oscillator is energized to send out a sound wave, for example, of 5,000 cycles. The frequency of the sound received at microphone station 1 will be determined by the frequency of the sound wave emitted from the oscillator and the velocity of the vessel carrying the oscillator relative to the microphone. This is according to the Doppler principle. As an illustration of this principle, take, for example, a vessel emitting a note of 5,000 cycles going directly toward the receiving station at a speed of 30 knots (15 meters per second). The observed frequency at the station will then be 5050 cycles. This is obtained by applying the formula:—

$$n_o = n_s \frac{V_1 + V_2}{V_1}$$

where $n_o$=observed frequency $n_s$=sending frequency $V_1$=velocity of sound in salt water (1503$^m$/sec)

$V_2$=velocity of the ship relative to the microphone from which it can be seen that the velocity of the ship can readily be calculated.

The system in its simplest form may best be described by reference to Fig. 1. The antenna 21 of the coastal radio transmitting station 5 is energized by a radio frequency generator 22 connected to a modulating power amplifier 20 working, for example, at 300 k. c. (1000 meters). This power amplifier of the carrier wave or current of A frequency, is modulated by three intermediate or B frequencies, which can be 10,000 cycles, 20,000 cycles and 30,000 cycles, or any other values desired for the purpose. Each of these different intermediate frequencies of which there may be any convenient desired number are in turn, modulated by the sound waves, which may have been amplified if found necessary or desirable, coming from the microphones 1, 2 and 3, respectively. These microphones are suitably placed so as not to be disturbed by undesirable sound reflections from the shore. Any desired number of microphone stations may be used.

A transmitter of the proper design is shown schematically in Fig. 1 where as shown the microphones at 1, 2 and 3 are connected to modulating devices 14, 15 and 16 in which the microphone currents respectively modulate the B frequency currents from generators 17, 18 and 19 which act together to cause a multiple modulated carrier wave to be impressed on the antenna 21 by the power amplifier 20. Such a radio transmitter may emit a carrier wave of 300 k. c. for example, upon which have been super-imposed intermediate waves having frequencies of 10,000 cycles, 20,000 cycles and 30,000 cycles respectively, the amplitude of each of these intermediate waves being controlled or modulated by the sound waves picked up by their associated microphones connected through the modulators 14, 15 and 16 respectively and also through sound amplifiers if so desired (not shown).

Figure 2:
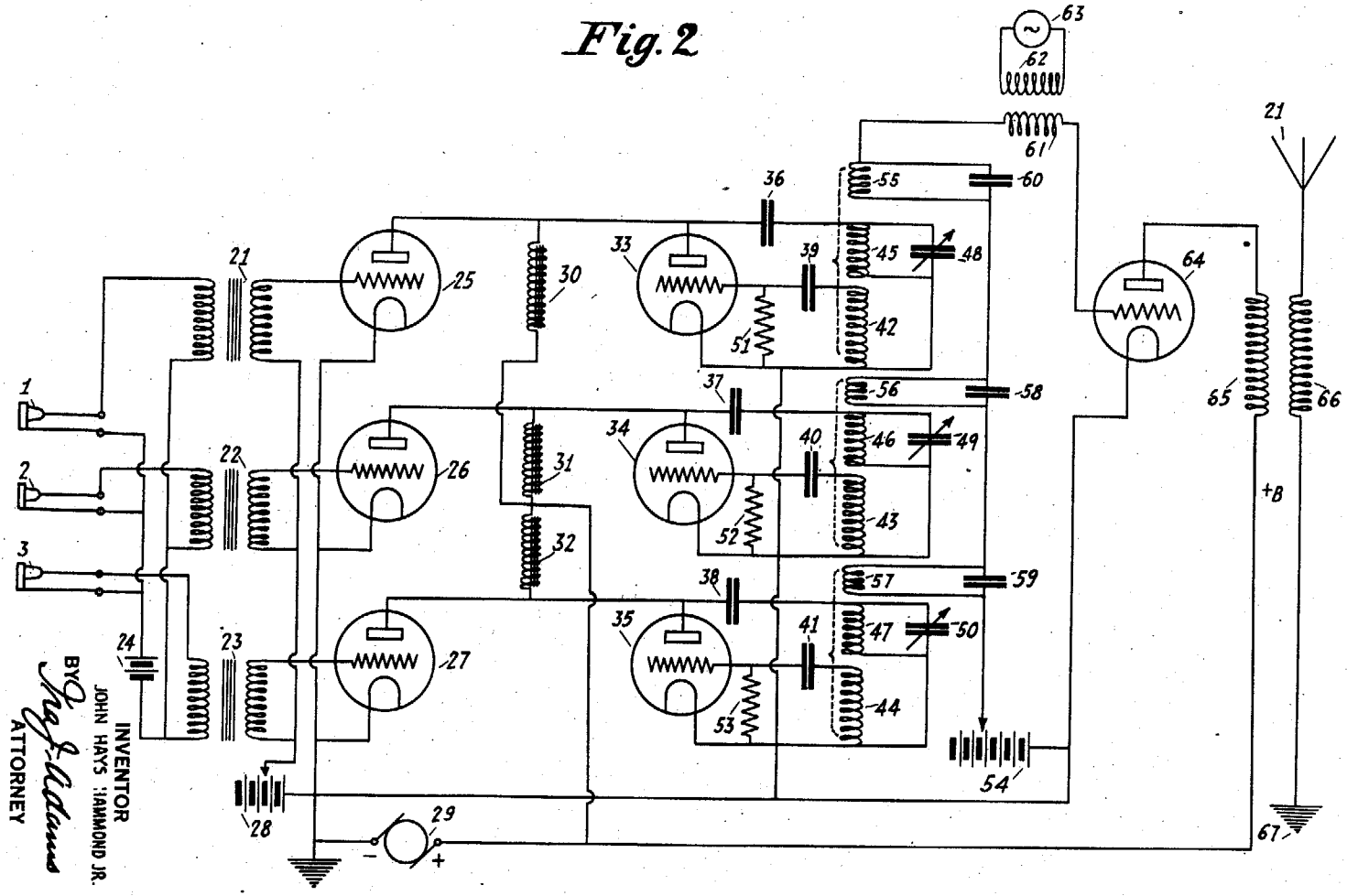
Fig. 2 is a diagrammatic representation of the radio transmitting installation.

The electrical connections for the transmitter as shown in Fig. 2 are substantially equivalent to the well known complex wave transmission system. The antenna 21 is connected to the ground at 67 and coupled to the power amplifier 64, through coils 65 and 66. The amplifier 64 amplifies the carrier wave produced by the alternator 63 which delivers energy through the coupling 61—62. The amplified energy is modulated by the B frequencies produced by tubes 33, 34 and 35 coupled through coils 55, 45, 42, 56, 46, 43, and 57, 47 and 44 respectively. Tuning condensers 48, 49 and 50 are inserted in the circuit as are also by-pass condensers 60, 58 and 59 in the usual manner. The customary biasing battery 54 and grid leaks 51, 52 and 53 are inserted in their proper relation in the circuits. The B frequency currents are modulated by the C frequency current transmitted from the microphones 1, 2 and 3 through transformers 21, 22 and 23 and battery 24 to the modulating tubes 25, 26 and 27. These modulating tubes also have the usual C battery as indicated at 28. Plate current is supplied through the generator 29 through choke coils 30, 31 and 32. Stoppage condensers 36, 37 and 38 are placed in the usual position in the plate filament circuits to open the circuits to direct currents.

To determine the relative position of a ship with respect to known points on land, the complex modulated carrier wave radiated by the above described transmitter is received on board the vessel and detected in the customary manner of detecting complex carrier waves. The intermediate B frequencies are selected by resonant circuits, Fig. 3, each of which is associated with a corresponding B frequency detector and in the output circuits of each of these detectors will appear voltages of frequencies of 10,000 cycles, 20,000 cycles and 30,000 cycles, respectively. These voltages are impressed upon the C frequency detectors which make audible the sounds picked up by the respective microphones at the transmitter. Connected to each of the C frequency detectors is a volume indicator which produces a graphical record of the relative intensity of the sounds striking microphones 1, 2 and 3. The intensities thus recorded are substantially inversely proportional to the distance from the sound source to each of the microphones. Therefore, such a record indicates the distance from the ship to the various microphones, or, in other words, fixes the position of the ship with reference to the known points at which the microphones are located. A further description of a recorder suitable for use as above mentioned appears below. The output from the C frequency detectors may be fed to D frequency detectors for purposes later to be described.

Figure 3:
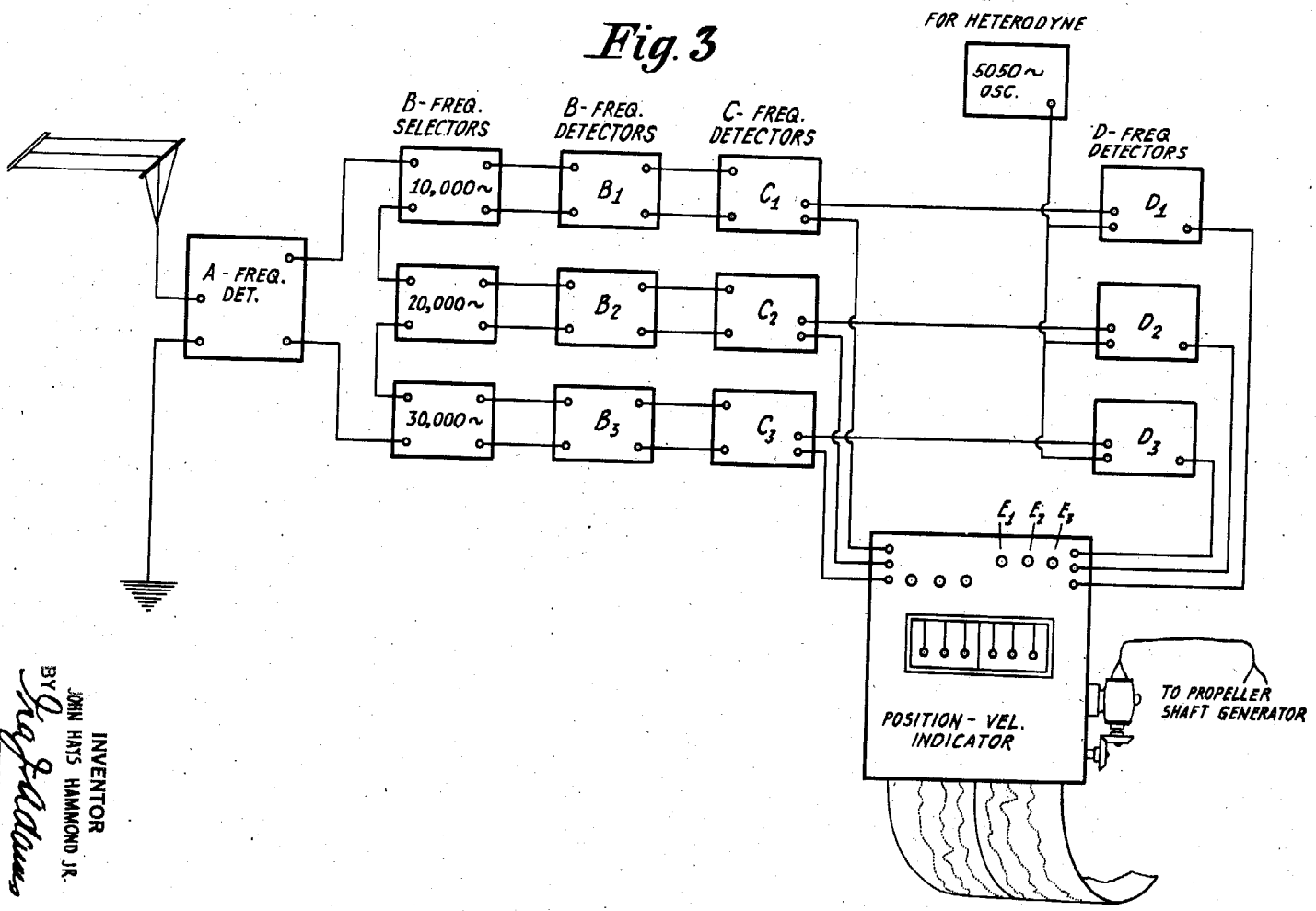
Fig. 3 is a diagrammatic view of the receiving apparatus.
Figure 4:
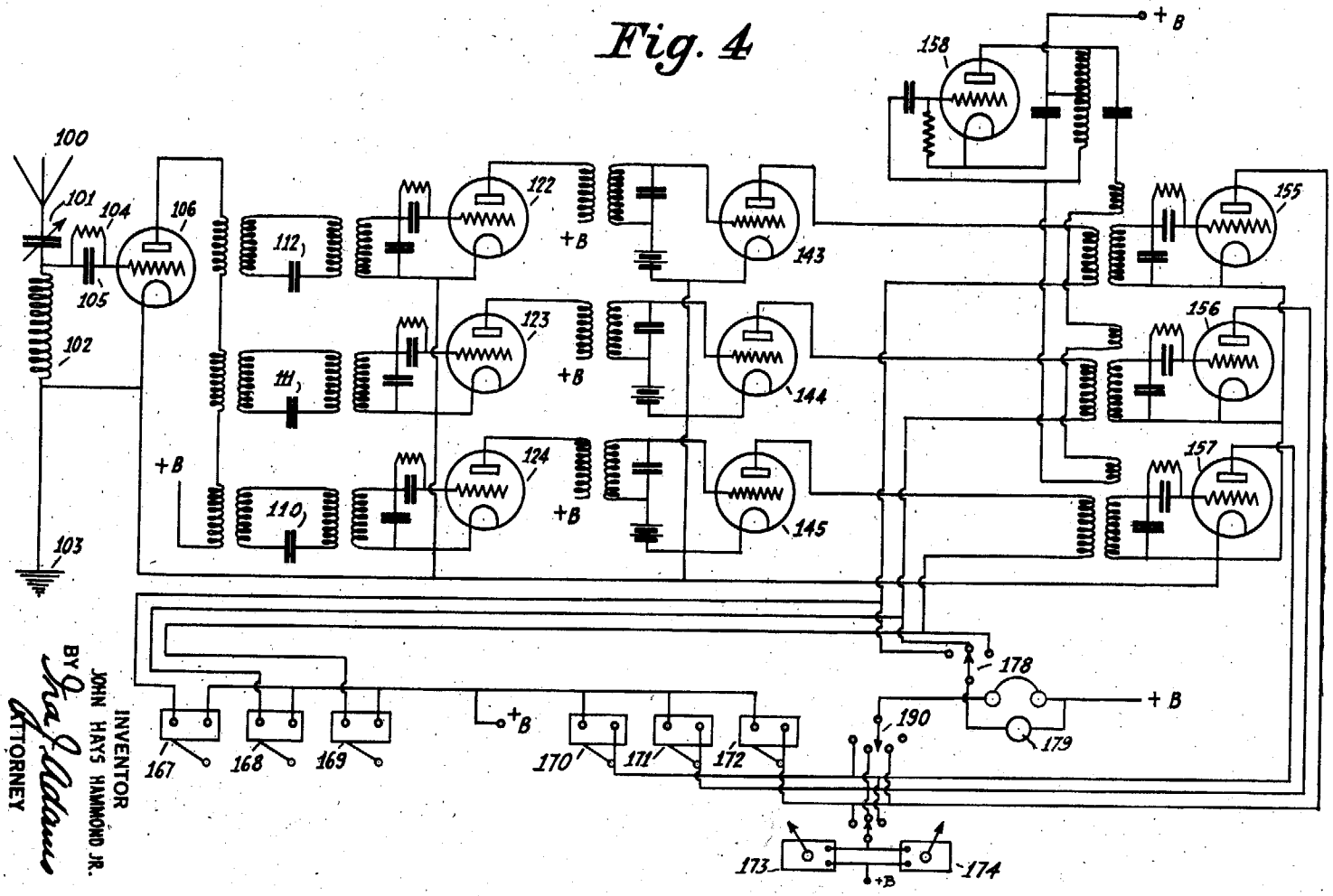
Fig. 4 shows the electrical connections of the radio receiver.

The receiving apparatus indicated in Fig. 3 and as shown in more detail in Fig. 4 embodies the usual double detector system for receiving complex modulated waves. The modulated wave is received in the usual manner by the antenna 100 connected to a single circuit tuner 101, 102 supplying detector 106 equipped with the ordinary grid leak and condenser 104 and 105. This is an A frequency detector. The plate circuit of this detector feeds three resonant circuits tuned respectively by condensers 110, 111, 112, to the three B frequencies.

Three B-frequency detectors 122, 123 and 124 are provided each with the usual grid leak and condenser and tuned input circuit. These demodulating devices take their input power from the above-mentioned tuned filter circuits and deliver their outputs to the "C" frequency detectors 143, 144 and 145 the frequency super-imposed on each B frequency channel, that is, of course, the C-frequency. The input circuit of each of these three C detectors comprises the usual tuned circuit. Each detector is provided with a grid bias battery of sufficient voltage to bring the detector plate current to zero when there is no incoming signal. In the plate circuit of each C detector is an indicating device as shown in 167, 168 and 169.

The indicating devices 167 to 169 shown in Fig. 4 consist merely of milliammeter movements, so that each pointer carries a marking device such as the pencil or stylus and is for the purpose of making a graphical record upon a strip of paper. Since the deflection of each indicator is proportional to the plate current flowing through it and this current is in turn dependent upon the strength of the signal input, it will be seen that the graphical record will show the amplitude of the received C frequency.

For the purpose of indicating the velocity of the ship relative to the microphone stations, the output from each of the C frequency detectors is taken to a D frequency detector which is connected to a local oscillator having, in this case, a frequency of 5050 cycles. Beat frequencies result from the heterodyne action between each incoming C frequency and current from this local oscillator. The resultant beat note will be 50 cycles when the ship is neither approaching nor departing from the microphone. At a speed of 30 knots a zero beat frequency would indicate a speed of 30 knots toward the microphone and a beat of 100 cycles would indicate a speed of 30 knots away from the microphone; this will be described in more detail later. The exact frequency of the beat note in each of the three channels is recorded by means of an attached frequency indicator. Continuing with the description of the receiver, as shown in Fig. 4 we come to the D-frequency detectors 155, 156 and 157. The input circuits of these are of the usual form.

Since heterodyne reception is desired, an oscillator 158 is provided. This oscillator may be utilized to furnish the heterodyning frequency to all three D-detectors. The input to these three D-detectors is taken from the three corresponding C-frequency outputs. The resulting heterodyned frequencies which will vary between the limits of 0 and 100 cycles, are led to the associated frequency indicators 170, 171 and 172.

Indicators shown at 170, 171 and 172 are for the purpose of indicating frequencies between 0 and 100 cycles and can be of any well known type, preferably of a moving pointer type sometimes called the resonant circuit frequency indicator. The pointers of these frequency indicators carry a pencil so that they graphically record their readings on a moving strip of paper.

The two frequency indicators 173 and 174 which are used in the "simple bearing indicator" are instruments similar to the frequency meters 170, 171 and 172 except these are equipped with pointers moving in a suitable manner over a scale. The moving coil system in such a meter controls a pointer which moves in response to any change in frequency. In this invention the pointer may be equipped with a marker so that graphical record frequency changes are obtained from which the velocity of the ship relative to the microphone stations can readily be calculated or computed.

The switches 178 and 190 allow the telephone receivers or indicator 179 to be switched into either the C-frequency detector or D-frequency detector circuits for the purpose of checking, by ear, the operation of the system and allowing the operator to make desired observations.

Figure 5:
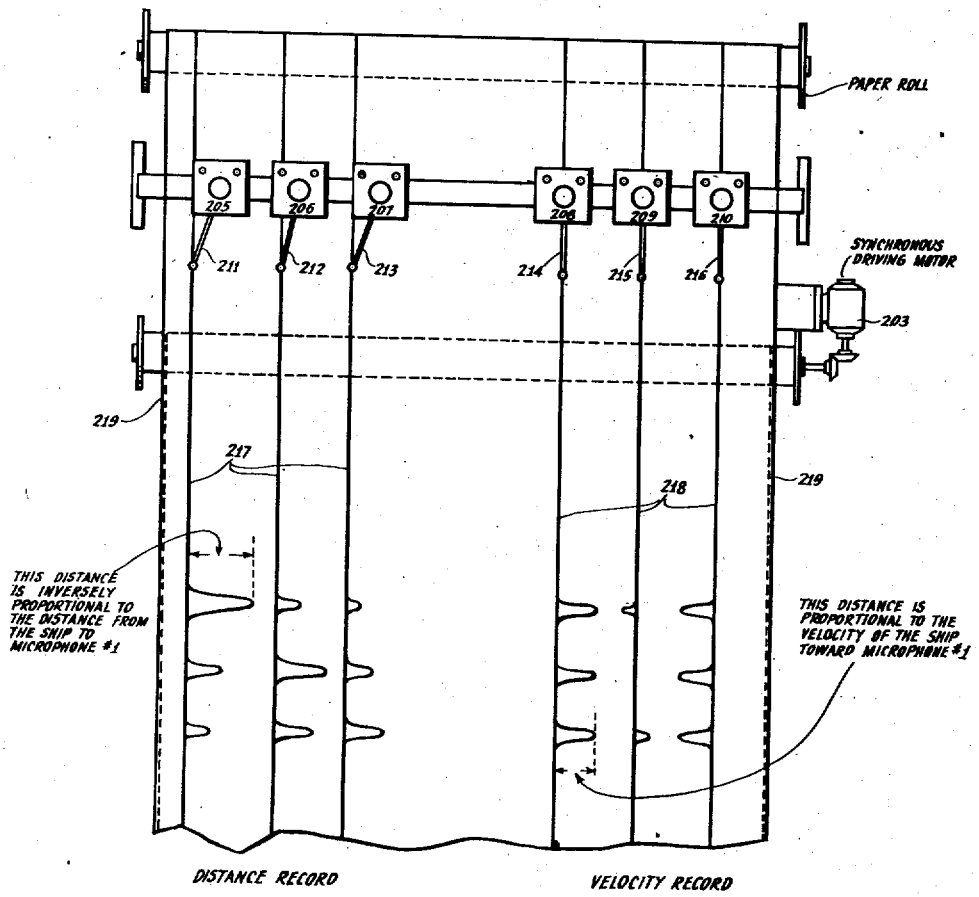
Fig. 5 is a view of the graphic recorder.

In order that the navigator of the ship may have a continuous graphic record of his proximity and velocity of approach to the fixed station, a graphic recorder may be used as illustrated in Fig. 5. The strip of paper 219—219 upon which the record is made is drawn through the recording device by a synchronous motor 203 driven from a generator attached to the ship's propeller shaft. Marking on this paper, which is ruled with suitable lines 217, 218 are a set of six markers or pens, 211, 212, 213, 214, 215, 216 in two groups of three each. The markers of the first are moved across the papers by means of a micro-ammeter movement which, being connected to the output of the C frequency detectors, serves in a well known manner to indicate the intensity of the sounds striking microphones 1, 2 and 3 to which they are respectively connected by the radio link. If no sound strikes these microphones the output of each C frequency detector will be zero and the pens will trace a mark along the zero line printed on the paper strip. A sound originating near microphone 1 would cause the marker of the intensity indicator connected to detector $C_1$ to move across the paper and indicate considerable intensity, while the pen connected to $C_2$ energized by microphone 2 will show less intensity and the pen connected to $C_3$ energized by microphone 3 will show still less intensity.

The other group of three indicators indicate the ship's velocity with reference to the microphone stations 1, 2 and 3. These indicators comprising frequency meter movements are connected to the D frequency detectors $D_1$, $D_2$ and $D_3$ in such a manner that they will trace upon a paper record, lines showing the variation in frequency of the sound waves striking the individual microphones to which they are linked by radio thereby indicating indirectly the ship's velocity in reference to the microphone.

In order to measure the relative velocity of the ship toward or away from any fixed microphone station, a frequency of the beat note obtained in each D frequency detector output circuit through the heterodyned action is fed to the frequency meters mentioned above which are recalibrated to read in knots indicating at the same time whether this speed is toward or away from the station microphone to which each frequency indicator is connected. The operation of this system is as follows:—

A vessel steaming at say 30 knots per hour comes in range of an installation such as described above. Desiring to know its position and ground speed, the vessel, by means of its submarine oscillator sends out an under-water sound wave of 5,000 cycles. We will assume that the position of the ship is abreast of microphone station 2 (Fig. 1) and that the ship is moving in a direction indicated by the arrow. There will then be received at microphone station 1, a frequency of say 5,030 cycles, the increase of 30 cycles being due to the component of the velocity of the vessel toward microphone station 1. The sound waves received by microphone 2 will be 5,000 cycles, there being approximately no velocity component in this direction and that received by microphone station 3 will be 4,970 cycles inasmuch as the vessel is moving away from this point. There will flow, therefore, in each of the three cables connecting the microphones to the radio station, currents of slightly different frequency, each of these, amplified if desired, will be caused to modulate its intermediate frequency generator. We will assume the microphone 1 is associated with the intermediate frequency of 10,000 cycles, microphone 2 with 20,000 cycles and microphone 3 with 30,000 cycles. These intermediate frequencies, having been varied in amplitude by sounds picked up by their associated microphones, are super-imposed upon the carrier wave and the resulting modulated complex carrier wave radiated into space.

This wave being received by the moving vessel, is successively detected in the usual manner of detecting such complex waves, resulting in obtaining in the output circuit of the C frequency detectors, the sound waves picked up by their respective microphones.

In the output circuit of detector $C_1$, there will be flowing a current whose frequency is 5030 cycles, in $C_2$, 5000 cycles and in $C_3$, 4970 cycles. The amplitude of each of these currents will be proportional to the strength of the sound wave which energizes the microphone of that particular channel, thus the amplitude of the signal coming from microphones 1 and 3 will be approximately equal and less than that received from microphone 2 due to the position of the ship which we have assumed to be as shown in Fig. 1. The relative amplitudes can be seen by inspecting the chart traced by the graphical recorder which is being run at a speed proportional to that of the ship's propeller. From this record, the navigator can estimate the position of the ship with respect to the fixed microphone stations, as from the usual data taken from ships he knows the mileage traveled relatively to the water and the revolutions and slip of the propeller.

To obtain the velocity with which the ship is moving with reference to these three points, a navigator would observe the companion record made by the three frequency indicating devices, these being operated indirectly from the output circuit of the three C frequency detectors in the following manner:—

Referring again to Fig. 4, the frequency derived from $C_1$ being 5030 cycles is actuated upon by a local oscillator generating 5050 cycles so that after passing through detector $D_1$, the beat frequency would be 20 cycles. A voltage of this frequency when supplied to the recording mechanism will cause a marker to move to a position corresponding to 20 cycles. The frequency reaching detector $D_2$ is 5000 cycles hence the resulting beat note of 50 cycles would be indiated in a similar manner upon the record as would be the frequency of 80 cycles obtained by heterodyning the 4970 cycle output of detector $C_3$.

By suitable calibration the velocity of the ship toward or away from any of the three fixed points may be read in knots per hour from the velocity traced by the graphic recorder. For instance, the position of the frequency marker should be along the middle or zero line for 50 cycles. For higher frequencies it should indicate on the side of this mid-line marked "stern" and for frequency lower than 50 cycles, the pointer should record on the side marked "ahead".

The principle involved in this invention can also be adapted to determine the distance between a ship and a fixed point. The system upon which this determination can be made is as follows:—

Figure 8:
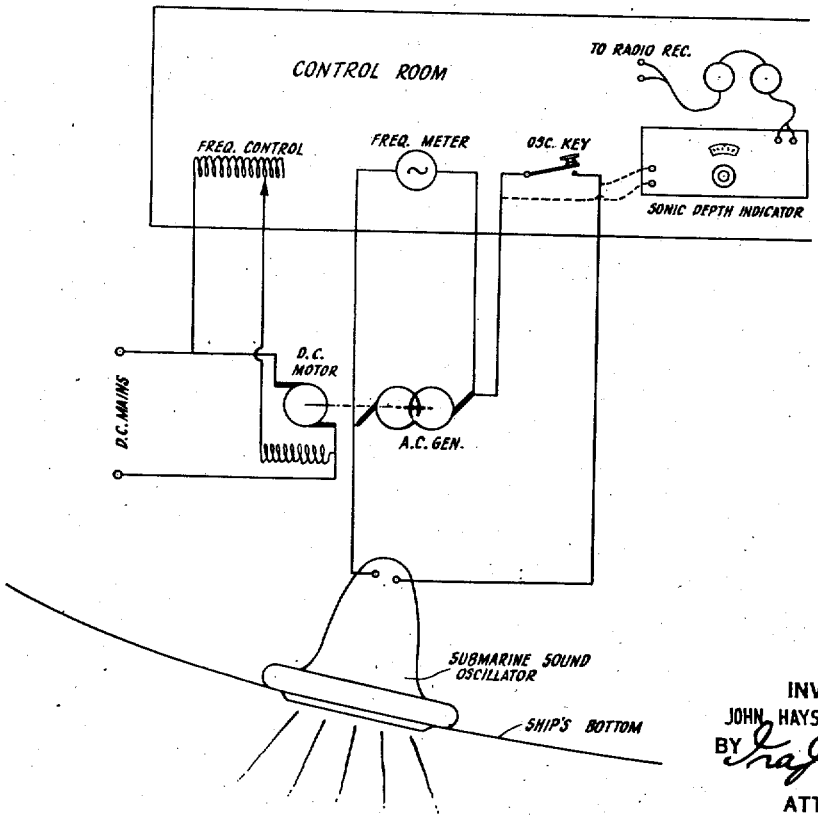
Fig. 8 is a diagrammatic drawing of the connections for the sound transmitter and Sonic Depth Indicator.
Figure 9:
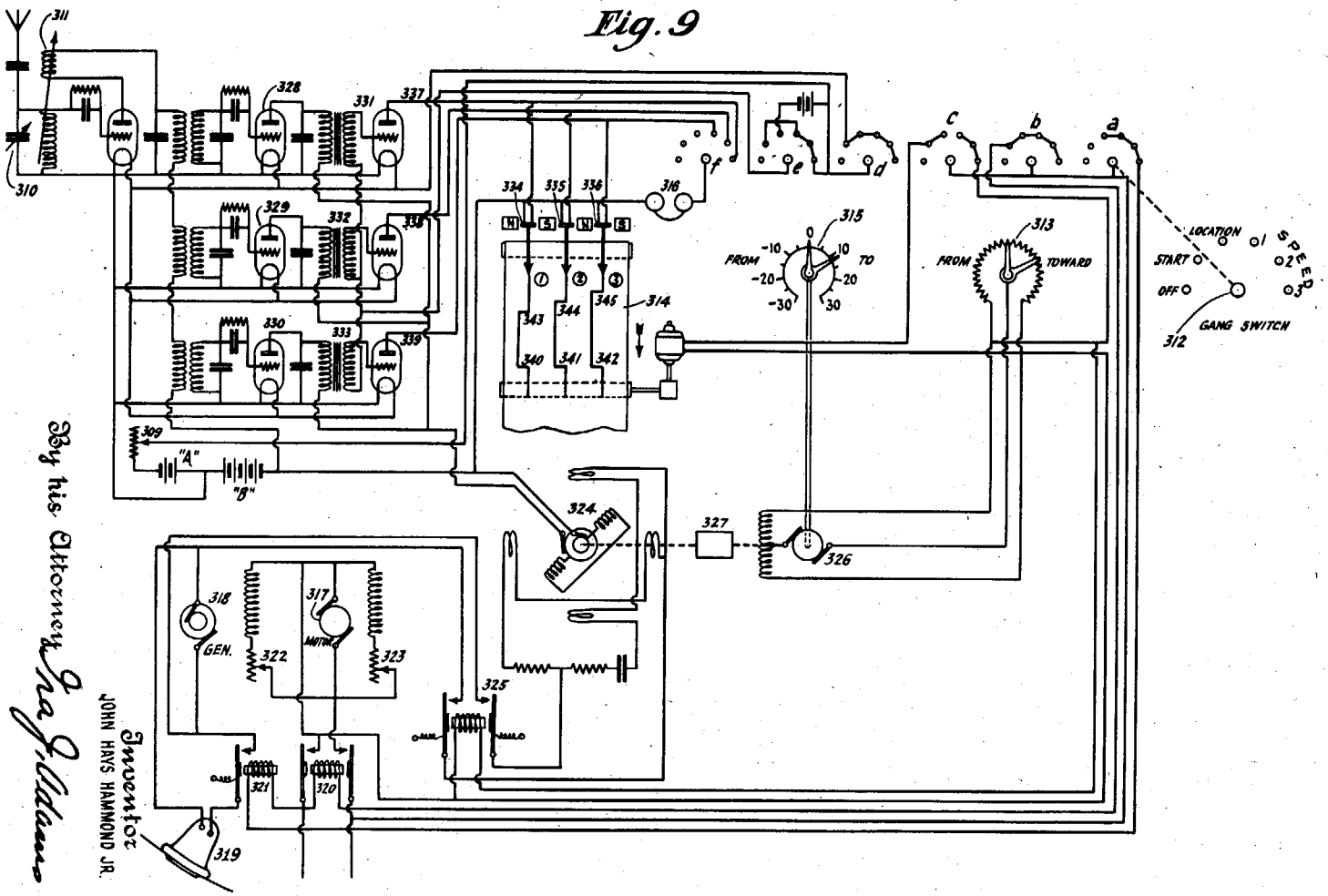
Fig. 9 is a diagram of connections of a zero beat installation.

If a sound signal is sent from the ship and received by a microphone located at a known point and this received sound signal is re-transmitted over a radio channel back to the ship, the time lapsed will give the distance from the ship to the fixed point since the velocity of sound in water and of radio waves in ether is accurately known. Using the apparatus previously described if the navigator desired to determine distance he would send a dot on the ship's under-water oscillator and listen for the return of this sound via radio by means of a sonic depth indicator, a device commonly used for measuring the lapsed time of echoes from the sea bottom. Such an arrangement is shown in Fig. 8. Means for doing this in accordance with the present invention are shown in Fig. 9 which will be described more in detail hereinafter.

Figure 6:
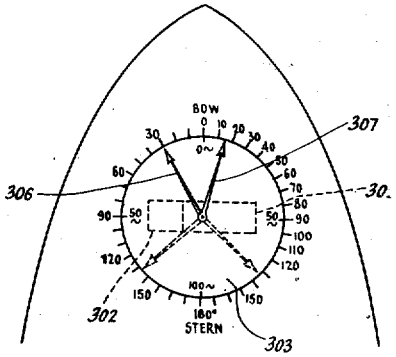
Figs. 6 and 7 are views of the bearing indicator.
Figure 7:
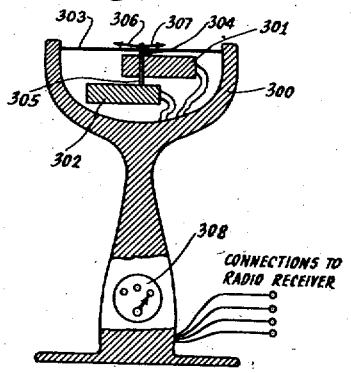

In Figs. 6 and 7 are shown an embodiment of this invention, the purpose of which is to enable the navigating officer of a vessel equipped with the apparatus described above to read from an indicator the approximate bearings with respect to any fixed microphone station. Such a system comprises a sound source, sound waves in water, a microphone located at a known point, a radio station emitting a radio wave preferably modulated by a complex wave, the sound waves picked up by the microphone, a radio receiver on board ship making possible the reception of the sounds picked up by the microphone, a recording device to accurately reproduce small differences in the frequency of said sounds as described above, and an indicator operated by said recording device. The operation of such a system would be as follows:—

Assume that vessel 4 in Fig. 1 is speeding at a rate of 30 knots directly away from microphone station 1. The oscillator sends out a 5000 cycles underwater signal from the ship's modulator. This signal is received by microphone 1 as 4950 cycles due to the velocity of the vessel directly away from the fixed point. This difference in frequency is in accordance with the Doppler principle, previously mentioned. The 4950 cycle note picked up by the microphone modulates the 10,000 cycle B frequency which, in turn, acts on the carrier wave. This carrier wave sent out from the coastal radio station, is picked up by the radio receiver on board the vessel where it is detected in the usual manner. The sounds picked up by microphone 1 will therefore be audible in the output circuit of detector $C_1$ in the manner explained above. The frequency of this circuit (4950 cycles) is passed on to detector $D_1$ where it is heterodyned to the beat note of 100 cycles per second. The frequency indicator referred to hereafter as the "bearing indicator", is connected in the output circuit of $D_1$ by means of a selector switch, the connections of which are shown in Fig. 4. This bearing indicator shown in Figs. 6 and 7 and described in detail later, is so constructed that when supplied with a source of power of zero frequency, its two pointers will lie along the zero line pointing to "bow". As the frequency is increased the pointers will rotate downwardly, one in a clockwise, the other in a counter-clockwise direction. When supplied with 50 cycles they will assume a position indicating 90 degrees and when the frequency is increased to 100 cycles they will be pointing at 180 degrees or at "stern". This calibration holds only when the ground speed of the ship is 30 knots per hour and when the sound source is 5000 cycles.

In the instrument shown in Fig. 7, the two pointers are similar in every way except they rotate in opposite directions, each having its independent frequency meter movement and are connected electrically in parallel. The reason for providing two pointers is that there is an ambiguity when taking a bearing as to whether the fixed station is on the right or the left of the ship.

This fact makes it necessary for the navigator when in doubt as to which side of the ship the microphone station is located, to swing his ship while noting the reading of the bearing indicator. If the fixed station be ahead and on the right, swinging his ship to the right will, of course, bring both pointers nearer to the position marked "tuned". The indicator is mounted upon a pedestal 300 which contains the entire mechanism.

The two moving elements 301, 302 of the bearing indicator are parts of the well known frequency indicating instrument known as a resonant frequency meter. Two shafts 304, 305, moving the two pointers 306, 307 are concentric, the outer shaft being hollow so that the inner shaft turns within it. The pointers play over a graduated dial 303. This bearing indicator usually gives only approximate bearings since to obtain a correct bearing it is necessary for the navigator to know the speed of the ship relative to the ground, which can only be calculated roughly. The frequency of the sound wave must, of course, be correctly adjusted as must also that of the receiving heterodyne oscillator. A switch 308 is mounted in the base of the panel for disconnecting the indicator.

A more detailed description of the zero beat method such as would be practiced from the principles of this invention will now be given.

Figure 10:
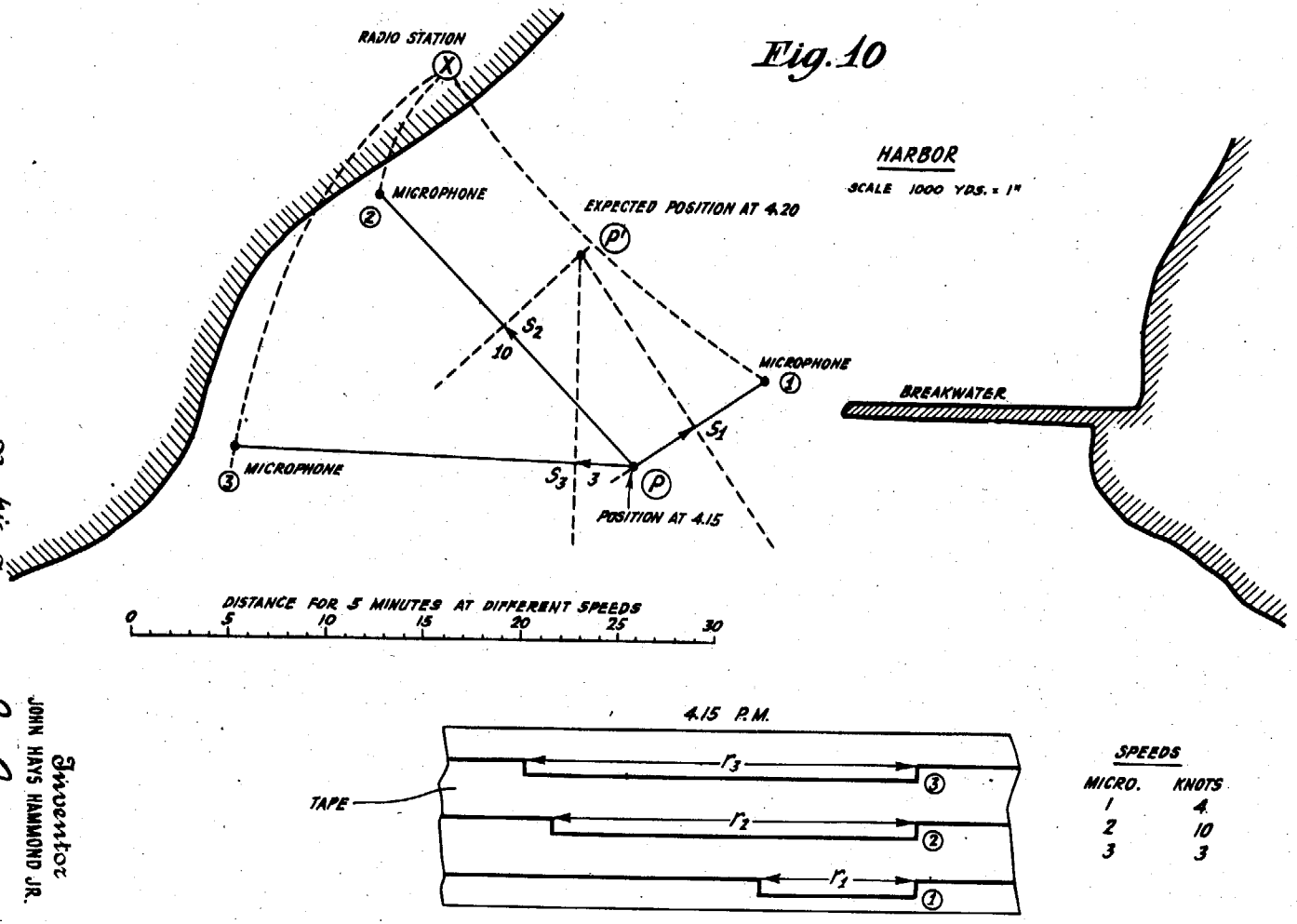
Fig. 10 is a sketch showing the method of plotting a vessel's position.

In an installation arrangement for the case of a zero beat method as shown in Figs. 9 and 10, assume for instance, a transmission system on shore, with arrangement substantially as in Fig. 2. Let the carrier wave length be 100 meters, corresponding to a frequency of 3,000 kilocycles. Let the frequency to be used for under-water transmission, be nominally 1,000 cycles, and let the intermediate frequencies be 15,000, 20,000 and 25,000 cycles respectively. Then the essential radiations are comprised in a spectral band from 2974 to 3026 kilocycles, and these can be effectively handled by comparatively simple apparatus. The alteration of the 1,000 cycle note due to the Doppler effect is very closely a third of a cycle per second for every knot speed in the direction of the receiving microphone, and with the receiving equipment shown, is sufficiently great to determine speeds correct to the nearest knot.

The ship's installation would be as shown in detail in Fig. 9. The apparatus for operating the installation comprises filament rheostat 309, tuning condenser 310 and regeneration control 311 of the radio receiver, gang switch 312, and beat regulator 313. Distances are recorded by recorder 314, and speeds directly indicated by tachometer 315 when the beat regulator has been adjusted to give zero beat at 1,000 cycles as indicated audibly by headphones 316.

Below decks is the motor-generator set 317, 318, for actuating the sound producer 319. Means are provided in relays 320 and 321 for remote control of the motor-generator set, and closure of the sound oscillator circuit. Field rheostats 322 and 323 are for adjusting the frequency and voltage of current supplied to the oscillator. The present beat arrangement does not require these to be constant, and in fact, the frequency might drift by as much as 20 cycles per second during the observations without affecting the accuracy of the speed determination. For the insertion of a beating note into the receiver system, corresponding to vacuum tube oscillator 158 of Fig. 4, frequency changer 324 is used. This comprises a set of field coils, with phase splitting means in a well known manner for producing a rotating magnetic field, with speed of rotation equal to the electrical frequency of current produced by generator 318. These field windings are excited upon closure of relay 325. The armature of the frequency changer is rotated by means of motor 326, with reducing gear 327 interposed between the motor armature and the armature of frequency changer 324. These armatures may be rotated in either direction, under the control of the beat regulator 313. Connections are such that during operation, the line voltage is across the field winding of the motor 326, and also across the resistance of the regulator 313. The armature of the motor is connected between the mid tap of the field winding and the moving tap of the regulator. Consequently when the moving tap is set at the mid point of the regulator, there is no voltage across the armature winding and consequently no motion. If the pointer is displaced, however, armature current will be established, producing rotation in one direction if the pointer is moved to the right, and in the other if moved to the left. Further, the speed developed increases with the amount of the displacement.

The frequency of the current produced by frequency changer 324 will be the impressed frequency which is equal to that actuating the sound producer 319, increased by the speed of rotation. This resultant frequency is used to match the returning frequency and the Doppler effect is directly measured by the speed of rotation. The dial of the tachometer is calibrated in knots, and with a 1,000 cycle tone indicates 30 knots when the Doppler effect of ten cycles per second change is being matched ten revolutions of the frequency changer per second.

The operation of the equipment requires consecutive movement of the gang switch from the "off" position through the different positions in succession. Turning to position "start" switch *b* starts the motor-generator set, switch *c* starts the motor which drives the distance recorder, switch *d* turns on filaments of the receiving set, and switch *e* connects the grid circuit of the audio amplifier tubes 331, 332, 333 to the negative of the "A" battery, for normal amplifying operation. Turning to position "location" which should be by a quick throw mechanism, switch *a* operates keying relay 321 to cause the sound signals to be sent out from sound producer 319. At the same time switch *e* places additional bias on the amplifier tubes, thereby cutting down on the current from the "B" battery through the recorder elements 334, 335, 336, to the plate of the amplifier tubes 337, 338 and 339 respectively. This change of current causes displacement lines 340, 341, 342 on the recorder sheet, at the instant of sending out sound. After the sound has reached the microphones, radio signals on the three intermediate channels will return to the radio receiver, and as above described will be separated out, signals from microphone 1 actuating only the amplifier tube 331, from microphone 2 actuating only amplifier tube 332, and from microphone 3 actuating only the amplifier tube 333.

Since the bias on these tubes is further negative than for undistorted amplification, the incoming signals will cause an increase of the direct current in the plate circuit, causing again displacements 343, 344, 345 on the recorder lines. The time intervals between the two sets of offsets is equal to the time required for the sound to reach the successive microphones, since the other time intervals in the transmission and reception are negligible.

If the charts for the use of the navigator are to a scale of 1,000 yards per inch, it would be convenient to have the motor so driven that the recorder tape will travel one inch in the time taken for sound to travel 1,000 yards, that is 0.6 second.

In this case, the distance between the offsets indicates directly the distance to the microphones in precisely the same scale as is used in the chart.

Having thus obtained data for plotting location, the operator will then turn the gang switch to determine speeds in the direction of microphones 1, 2 and 3 in turn. In each of these positions, switches *a* and *b* are operative, with sound going out from producer 319, switch *c* has stopped the recorder motor, and turned on power to the beat regulator motor 326, and also has closed relay 325 to the field of the speed changer 324, switch *d* continues the receiving set in operation, while switch *e* has again put the normal bias on amplifier tubes 337, 338, 339 for best amplification. For speed 1, the head phones 316 are across the recorder element for tube 337, and therefore receives the effect from microphone 1 only. For the other speed determinations the head phones are switched to tubes 338 and 339 in turn.

Assume the switch set for determination of speed in the direction of microphone No. 1, and that the beat regulator motor 326 is at rest, due to the beat regulator resistance 313 being so adjusted that there is no current through the armature of the motor. Suppose the current to the sound producer is 978 cycles per second, and the speed in the direction of microphone 1 is 15 knots, then due to the Doppler effect, the signal impressed on amplifier due to detected current from tube 328 will be of frequency 978 plus 5, or 983 cycles per second, since 15 knots produces a Doppler effect of 5 cycles per second when the original source is about 1,000 cycles. But the rotor of frequency changer 324 being at rest, there will be induced in it current of 978 cycles. Connections are such that the rotor feeds current into the plate circuit of detectors 328, 329, 330. Thus both the 983 cycle current and the 978 cycle current are impressed on the amplifier tube and actuate the headphones 316, causing the well known beating effect, at 5 beats per second. This beat frequency is reduced to zero by rotating the armature of the frequency changer at 5 cycles per second opposite to the direction of the rotation of the magnetic field, thereby producing a frequency of 983 cycles which matches the 983 cycles per second due to the detected current. This matching is accomplished by turning the beat regulator and when accomplished, the speed in the direction of the microphone is indicated directly by the tachometer. In this way the three speeds may be determined and values sent to the plotter for recording.

The method of plotting is shown in Fig. 10. The plotter is provided with a chart showing the coastal configuration and location of the microphones. Data for plotting furnished by the observer are first, the strip of tape showing the distances, and the time of taking observations, and then the speeds in knots in the directions of the three microphones. Assume that the tape has been so driven that the distances apply direct reading on the chart, as for example drawn to scale of 1,000 yards represented by one inch.

The location at the time of making the tape record is found by striking off from microphones 1, 2 and 3 in turn, arcs of radii $r_1$, $r_2$, $r_3$ equal to the distances between offsets on the tape. These three arcs intersect at the point P, which is the position at 4:15.

To determine the location after 5 minutes, for example, a scale is provided showing distance travelled at different speeds. Suppose the data is as shown that the speeds are 4, 10 and 3 knots toward microphones 1, 2 and 3 respectively. Then these three values are scaled off from point P in the three directions, giving points $S_1$, $S_2$, $S_3$. To find the resultant velocity of which these three values are components, lines are drawn through $S_1$, $S_2$ and $S_3$, perpendicular to the lines $PS_1$, $PS_2$, $PS_3$ respectively, and the point of intersection P′ will be the location to be expected after a five minute interval, unless the course is changed. The distance PP′ may be scaled to determine the knots at which the ship is traveling.

As previously mentioned, the number of microphone stations and the corresponding number of modulating frequencies in the complex carrier wave may be considerably multiplied.

By the use of the invention described, several vessels may obtain bearings simultaneously on the same course, each ship using a distinctive frequency coupled with a distinctive call signal.

I claim:

1. The method of determining the velocity and position of a ship at sea relative to a known point which comprises, generating and transmitting sound oscillations across the space intervening between a ship and a known point, receiving said sound oscillations, generating electroradiant oscillations, modulating said electroradiant oscillations by said received sound oscillations, transmitting said modulated oscillations across the space intervening between the known point and the ship, receiving said modulated oscillations and comparing the audio frequency component of the received oscillations with the sound oscillations originally transmitted to determine the relative motion of said ship with respect to said known point.

2. The method of determining the velocity and position of a ship at sea relative to a plurality of known points which comprises, generating and transmitting sound oscillations across the space intervening between a ship and a plurality of known points, receiving said sound oscillations, generating electroradiant oscillations in the form of a complex wave composed of high frequency oscillations modulated by a plurality of lower supersonic frequency components, modulating each of said supersonic frequency components by the sound oscillations as received at each of said known points, transmitting said modulated oscillations across the space intervening between one of said known points and the ship, receiving said modulated oscillations and comparing the various sound frequency components thereof with each other and with the sound oscillations originally transmitted, to determine the relative motion of said ship with respect to said known points.

3. A system for determining the location and movement of a ship comprising, a sound wave oscillator having a predetermined frequency of oscillation, sound receiver stations for receiving sound waves produced by said sound wave oscillator, a wireless transmitting station associated with said sound receiver stations for transmitting waves modulated in accordance with said received sound waves, a wireless receiving station for receiving said last mentioned waves, said sound wave oscillator and wireless receiving station as one group and said sound receiver stations and wireless transmitter as a second group being variably disposed relative to one another in distance and direction, and recording means associated with said wireless receiving station for recording the modulation frequency characteristics of the waves received by the last mentioned receiving means.

4. A system for determining the location and movement of a ship comprising, a sound wave oscillator having a predetermined frequency of oscillations, sound receiver stations for receiving the sound waves generated by said oscillator, a wireless transmitting station associated with said sound receiver stations for transmitting waves modulated in accordance with said sound waves, a wireless receiving station for receiving said last mentioned waves, said sound wave oscillator and said wireless receiving station as one group and said sound receiver stations and wireless transmitter as a second group being variably disposed relative to each other as regards distance and direction, and recording means including a graphic indicator for recording and indicating the intensity and modulation frequency characteristics of the waves received by the wireless receiving station.

5. A system for determining the position and movement of a ship comprising, a local sound wave oscillator for producing and transmitting sound waves having a predetermined frequency of oscillation, a radio transmitting station, a plurality of sound receiving stations connected electrically to said radio transmitting station, said radio station being adapted to transmit complex waves modulated by said sound waves as received by each of said sound receiver stations, a receiving station for receiving the complex modulated waves, said sound wave oscillator and said wireless receiving station as one group and said sound receiver stations and wireless transmitter as a second group being variably disposed relative to one another as regards distance and direction, and recording and indicating means for graphically and continuously recording the intensity and audio frequency characteristics of the component parts of the received radio wave.

6. A system for determining the position and movement of a ship comprising a sound wave oscillator having a predetermined frequency of oscillation located upon the ship, a distant radio transmitting station, sound receiver stations located at a distance from the ship and from each other and conductively connected to said radio transmitting station, means at said radio station for transmitting complex waves modulated by said sound waves, each component of the complex wave being modulated by one of the sound receivers, a local receiving station for receiving said complex modulated waves and recording and indicating means for graphically and continually indicating the modulation frequency characteristics of the received complex wave, said indicating means being calibrated to indicate the direction of the movement as well as the amount of the motion.

7. A method for determining the position and movement of a ship which consists in transmitting sound waves having a predetermined frequency of oscillation from the ship, generating a complex electric wave, receiving said sound waves at known points, and modulating said complex electric wave thereby, transmitting the modulated complex electric wave, receiving said electric waves upon the ship and comparing the relative intensities and frequencies of the sound frequency components of the said complex wave, and the original sound wave frequency.

8. A method of determining the velocity of a ship at sea relative to known points which consists in transmitting sound waves having a predetermined frequency of oscillation, receiving the sound waves at various known points, generating a complex electric wave, modulating said complex electric wave by the received sound waves, transmitting the modulated complex electric wave receiving said electric waves, heterodyning each component of the received electric wave to produce a beat note from each component, recording the beat note of each component wave and measuring the recorded beat note to indicate the ship's velocity relative to said known points.

9. A method for determining the position of a ship which consists in transmitting sound waves from the ship, receiving said sound waves at known points upon land, generating a complex electric carrier wave, causing these received sound waves to modulate the intermediate frequency components of said complex electric carrier wave, radiating said carrier wave into space, receiving the modulated electric wave upon the ship, detecting said electric wave to produce the intermediate frequency components thereof, again detecting to produce the sound frequency components of said intermediate frequency components and graphically recording the amplitude of the current values of each intermediate frequency component of the radiated carrier wave relative to the speed of the ship's propeller to determine the position of the ship.

10. The method for determining the ground speed of a ship which consists in transmitting sound waves having a predetermined frequency of oscillation from the ship, receiving said sound waves at known points on the land, generating a complex electric carrier wave, modulating the intermediate frequency components of said complex electric carrier wave by said received sound waves, radiating said carrier wave into space, receiving this electric wave upon the ship, detecting said electric wave to reproduce intermediate frequency components thereof, heterodyning each intermediate frequency component of the electric wave by the originally transmitted sound frequency, recording each resulting beat note, and calibrating the record produced thereby to indicate the velocity of the ship relative to each of said known points.

11. A system for determining the location and movement of a ship comprising, a sound wave oscillator having a predetermined frequency of oscillation, sound receiver stations for receiving sound waves produced by said sound wave oscillator, a wireless transmitting station associated with said sound receiver stations for transmitting waves modulated in accordance with said received sound waves, a wireless receiving station for receiving said last mentioned waves, said sound wave oscillator and wireless receiving station as one group and said sound receiver stations and wireless transmitter as a second group being variably disposed relative to one another, in distance and direction, and recording means associated with said wireless receiving station for recording the intensity of the modulation frequencies of the waves received by the last mentioned receiving means.

12. A system for determining the location and movement of a ship comprising, a sound wave oscillator having a predetermined frequency of oscillation, sound receiver stations for receiving sound waves produced by said sound wave oscillator, a wireless transmitting station associated with said sound receiver stations for transmitting waves modulated in accordance with said received sound waves, a wireless receiving station for receiving said last mentioned waves, said sound wave oscillator and wireless receiving station as one group and said sound receiver stations and wireless transmitter as a second group being variably disposed relative to one another in distance and direction, and indicating means associated with said wireless receiving station for indicating the modulation frequency characteristics of the waves received by the last mentioned receiving means.

13. A system for determining the location and movement of a ship comprising, a sound wave oscillator having a predetermined frequency of oscillation, sound receiver stations for receiving sound waves produced by said sound wave oscillator, a wireless transmitting station associated with said sound receiver stations for transmitting waves modulated in accordance with said received sound waves, a wireless receiving station for receiving said last mentioned waves, said sound wave oscillator and wireless receiving station as one group and said sound receiver stations and wireless transmitter as a second group being variably disposed relative to one another in distance and direction, and indicating means associated with said wireless receiving station for indicating the frequency and intensity of the modulation frequencies of the waves received by the last mentioned receiving means.

14. A method for determining the position of a ship which consists in transmitting sound waves from the ship, receiving said sound waves at known points upon land, generating a complex electric carrier wave, causing these received sound waves to modulate the intermediate frequency components of said complex electric carrier wave, radiating said carrier wave into space, receiving the modulated electric wave upon the ship, detecting said electric wave to produce the intermediate frequency components thereof, again detecting to produce the sound frequency components of said intermediate frequency components and observing the amplitude of the current values of each intermediate frequency component of the radiated carrier wave relative to the speed of the ship's propeller to determine the position of the ship.

15. A system for determining the location and movement of a ship comprising, a sound wave oscillator having a predetermined frequency of oscillation, sound receiver stations for receiving the sound waves generated by said oscillator, a wireless transmitting station associated with said sound receiver stations for transmitting waves modulated in accordance with said sound waves, a wireless receiving station for receiving said last mentioned waves, said sound wave oscillator and said wireless receiving station as one group and said sound receiver stations and wireless transmitter as a second group being variably disposed relative to each other as regards distance and direction, and recording means for recording the intensity and modulation frequency characteristics of the waves received by the last mentioned receiving means.

16. A system for determining the position and movement of a ship comprising, a local sound wave oscillator having a predetermined frequency of oscillation for producing and transmitting sound waves, a radio transmitting station, a plurality of sound receiving stations connected electrically to said radio transmitting station, said radio station being adapted to transmit complex waves modulated by said sound waves as received by each of said sound receiver stations, a receiving station for receiving the complex modulated waves, said sound wave oscillator and said wireless receiving station as one group and said sound receiver stations and wireless transmitter as a second group being variably disposed relative to one another as regards distance and direction, and indicating means for graphically and continuously indicating the intensity and audio frequency characteristics of the component parts of the received radio wave.

17. A method for determining the position and movement of a ship which consists, in transmitting sound waves having a predetermined frequency from the ship, generating a complex electric wave, receiving said sound waves at known points, and modulating said complex electric wave thereby, transmitting the modulated complex electric wave, receiving said electric waves upon the ship and recording the relative intensities and frequencies of the sound frequency components of the said complex wave, and the original sound wave frequency.

18. A method for determining the position and movement of a ship which consists in transmitting sound waves having a predetermined frequency from the ship, generating a complex electric wave, receiving said sound waves at known points, and modulating said complex electric wave thereby, transmitting the modulated complex electric wave, receiving said electric waves upon the ship and recording and observing the relative intensities and frequencies of the sound frequency components of the said complex wave, and the original sound wave frequency.

19. A system for determining the position and movement of a ship comprising, a local sound wave oscillator having a predetermined frequency of oscillation for producing and transmitting sound waves, a radio transmitting station, a plurality of sound receiving stations connected electrically to said radio transmitting station, said radio station being adapted to transmit complex waves modulated by said sound waves as received by each of said sound receiver stations, a receiving station for receiving the complex modulated waves, said sound wave oscillator and said wireless receiving station as one group and said sound receiver stations and wireless transmitter as a second group being variably disposed relative to one another as regards distance and direction, and recording and indicating means for graphically and continuously recording the frequency and intensity of the component parts of the received radio wave.

20. A method for determining the position of a ship which consists in transmitting sound waves from the ship, receiving said sound waves at known points upon land, generating a complex electric carrier wave, causing these received sound waves to modulate the intermediate frequency components of said complex electric carrier wave, radiating said carrier wave into space, receiving the modulated electric wave upon the ship, detecting said electric wave to produce the intermediate frequency components thereof, again detecting to produce the sound frequency components of said intermediate frequency components and graphically indicating and recording the amplitude of the current values of each intermediate frequency component of the radiated carrier wave relative to the speed of the ship's propeller to determine the position of the ship.

21. A method for determining the velocity of a ship at sea relative to known points which consists in transmitting sound waves, having a predetermined frequency, receiving the sound waves at various known points, generating a complex electric wave, modulating said complex electric wave by the received sound waves, transmitting the modulated complex electric wave, receiving said electric waves, heterodyning each component of the received electric wave to produce a beat note from each component, recording and indicating the beat note of each component wave and measuring the recorded beat note to indicate the ship's velocity relative to said known points.

22. The method for determining the speed of a ship relative to a fixed point which includes the step of transmitting an audio frequency signal by a slow transmitting medium between the two, receiving and retransmitting the signal in the reverse direction between the two through an instantaneous transmitting medium, receiving the retransmitted signal at the transmitting station and comparing the frequencies of the transmitted signal and the signal finally received thereat.

23. The method of determining the velocity and position of a moving object relative to a plurality of known points which comprises, generating and transmitting sound oscillations across the space intervening between the object and a plurality of known points, receiving said sound oscillations at each of said known points, generating electro-radiant oscillations in the form of a complex wave composed of high frequency oscillations modulated by a plurality of lower supersonic frequency components, modulating each of said supersonic frequency components by the sound oscillations as received at each of said known points, transmitting said modulated oscillations across the space intervening between one of said known points and the object, receiving said modulated oscillations and comparing the various sound frequency components thereof with each other and with the sound oscillations originally transmitted to determine the position and relative motion of the object with respect to said known points.

24. A system for determining the location and movement of a ship comprising, a sound wave oscillator having a predetermined frequency of oscillation, sound receiver stations for receiving sound waves produced by said sound wave oscillator, a wireless transmitting station associated with said sound receiver stations for transmitting waves modulated in accordance with said received sound waves, a wireless receiving station for receiving said last mentioned waves said sound wave oscillator and wireless receiving station as one group and said sound receiver stations and wireless transmitter as a second group being variably disposed relative to one another in distance and direction, and means associated with said receiving station for determining the modulated characteristics of the received waves for determining the location and movement of the ship.

25. A system for obtaining a ship's location and movement comprising a sound wave oscillator, microphone stations for receiving sound waves, a wireless transmitting station associated with each of said microphone stations for transmitting waves modulated in accordance with said received sound waves, and recording means associated with said sound wave oscillator for recording the characteristics of the waves received by the last mentioned receiving means.

26. The steps in a method of determining the position of an object with respect to known points which comprise generating and transmitting sound oscillations across the space intervening between the object and the known points, receiving said sound oscillations at said known points, generating electro-radiant oscillations, modulating said electro-radiant oscillations by the various received sound oscillations, transmitting said modulated oscillations across the space intervening between the known points and the object, receiving said modulated oscillations, deriving therefrom the various sound oscillations and comparing the intensity of said various derived sound oscillations.

27. The steps in a method of velocity determination of an object which comprise determining the velocity of the object in a plurality of directions by generating and transmitting sound oscillations across the space intervening between the object and several known points, receiving said sound oscillations at said points, generating electro-radiant oscillations, modulating said electro-radiant oscillations by said received sound oscillations, transmitting said modulated oscillations, receiving said modulated oscillations at the object and deriving therefrom the various sound oscillations and comparing the frequency of the various derived sound oscillations with the frequency of the sound oscillations as originally generated at the object.

28. The steps in a method of charting the course and predicting the future position of a moving object which comprise, generating and transmitting energy waves of a predetermined frequency across the space intervening between the object and several known points, receiving said energy waves at said points, generating electro-radiant oscillations, modulating said electro-radiant oscillations by said received energy waves, transmitting said modulated oscillations, receiving said modulated oscillations at the object and deriving therefrom the various energy waves, comparing the intensity of said various derived energy waves and comparing the frequency of the various derived energy waves.

29. The steps in a method of charting the course and predicting the future position of a moving object relative to known points which comprise transmitting energy waves from the object having a predetermined frequency of oscillation, receiving the energy waves at various known points, generating carrier frequency energy, modulating the carrier frequency energy with the received energy waves from at least two of said points, transmitting the resultant modulated energy, intercepting the transmitted modulated energy at the object, demodulating the received energy so as to derive therefrom the various energy wave components, determining the position of the object with respect to said known points by noting the relative intensity of the various energy wave components received at said points as derived from the intercepted transmitted modulated energy and determining the velocity and direction of movement of the object by noting the relative frequency characteristics of the various energy wave components received at said points as derived from the intercepted transmitted modulated energy.

30. The steps in a method of predicting the future position of a moving object relative to known points which comprise, transmitting energy waves from the object having a predetermined frequency of oscillation, receiving the energy waves at various known points, generating carrier frequency energy, modulating the carrier frequency energy with the energy waves as received from at least two of said points, transmitting the resultant modulated energy, intercepting the transmitted modulated energy at the object, demodulating the intercepted energy so as to derive therefrom and identify the various energy wave components as received at each of said various known points, determining the position of the object with respect to said known points by noting certain of the characteristics of the various energy wave components as derived from the transmitted modulated energy and determining the velocity and direction of movement of the object by noting certain other characteristics of the energy wave components as derived from the transmitted modulated energy.

31. A method of predicting the future position of a moving object relative to known points which includes the steps of transmitting from the object, low frequency waves of a predetermined frequency, receiving the low frequency waves at various known points, generating a complex electric wave, modulating the complex electric wave by the received low frequency waves, transmitting the resultant modulated energy, receiving the transmitted energy at the object and deriving from the received energy the low frequency modulation components, determining the position of the object with respect to the said points by noting the relative intensity of the derived low frequency modulation components, generating a heterodyne frequency, beating each of the low frequency wave components with the generated heterodyne frequency and producing therefrom a resultant beat note for each of said components and determining the ship's velocity and direction of movement thereof relative to said known points by noting the relative frequency of each of the resultant beat notes.

32. The steps in a method of predicting the future position of a moving object relative to known points which comprise transmitting low frequency waves from the object to a plurality of known points, receiving the transmitted low frequency waves at the said known points, selectively modulating electro-radiant energy with the received low frequency waves, transmitting the modulated electro-radiant energy, receiving the transmitted energy and determining the position of the object, the velocity thereof and its direction of movement by comparing the intensities of the various low frequency components of the received energy and comparing the frequency of each of the low frequency components of the received energy with a standard frequency.

33. A method of predicting the future position of a moving object relative to a known point which includes the steps of transmitting from the object energy waves of a known frequency, receiving the transmitted energy waves at various known points, generating electro-radiant energy and selectively modulating the generated electro-radiant energy by the energy waves received at said points, transmitting the resultant modulated energy, receiving the transmitted energy and deriving therefrom each of the modulation components, determining the position of the object with respect to said point by noting the relative intensity of the derived modulation components, determining the direction of movement and the velocity of the object with respect to said point by noting the degree of change in frequency and the direction of the change from a mean value.

JOHN HAYS HAMMOND, Jr.